Sept. 14, 1965     P. C. KOCH ETAL     3,205,770
MICROPROJECTOR
Filed Jan. 11, 1963     3 Sheets-Sheet 3
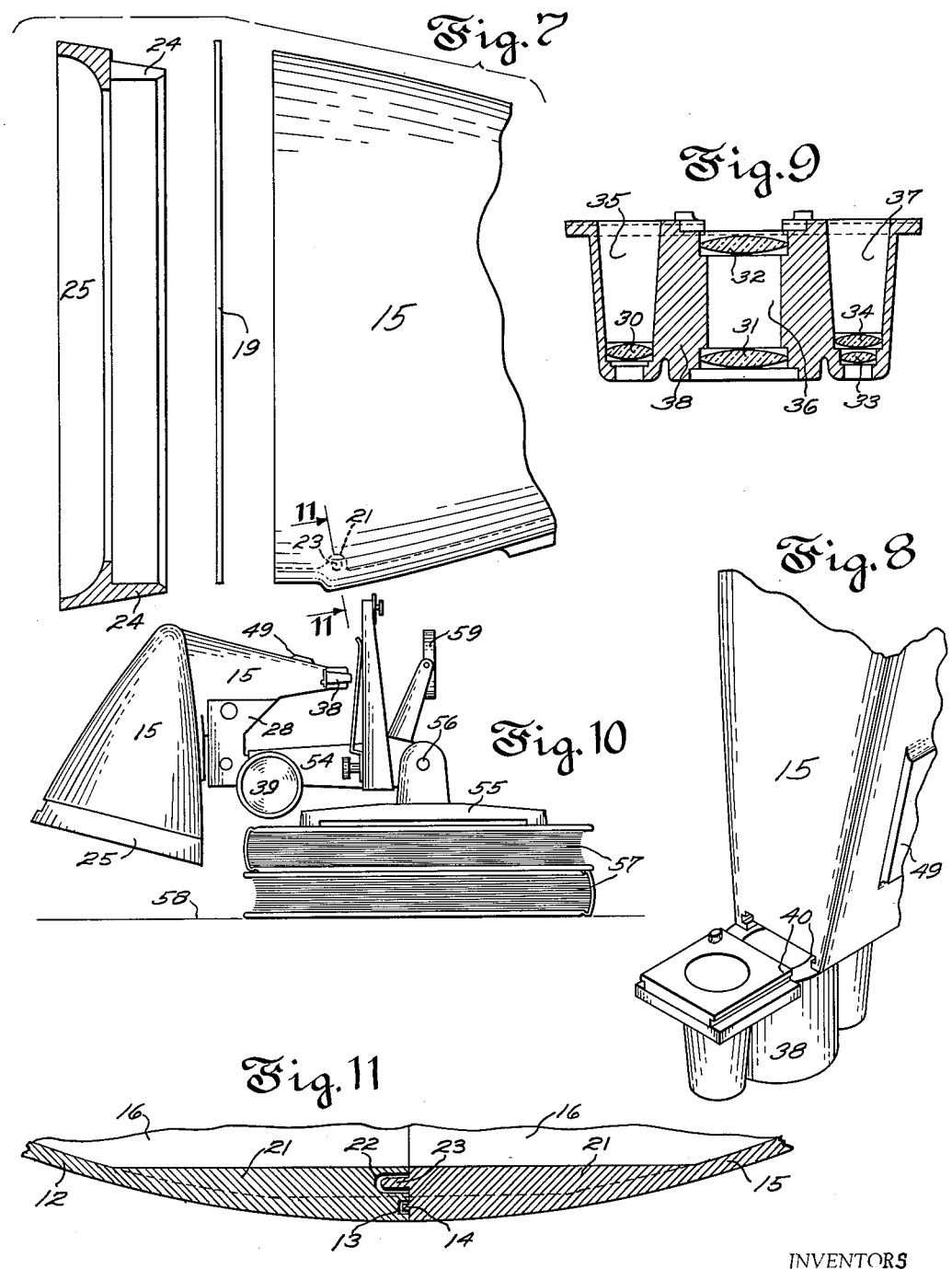

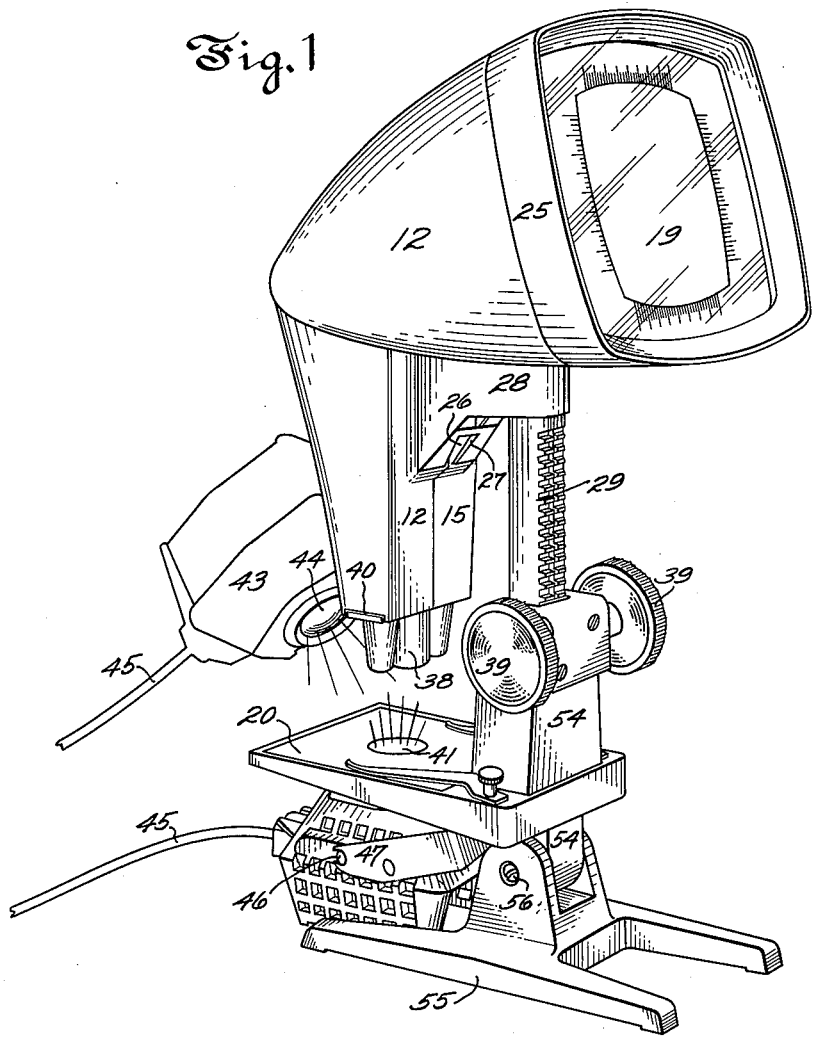

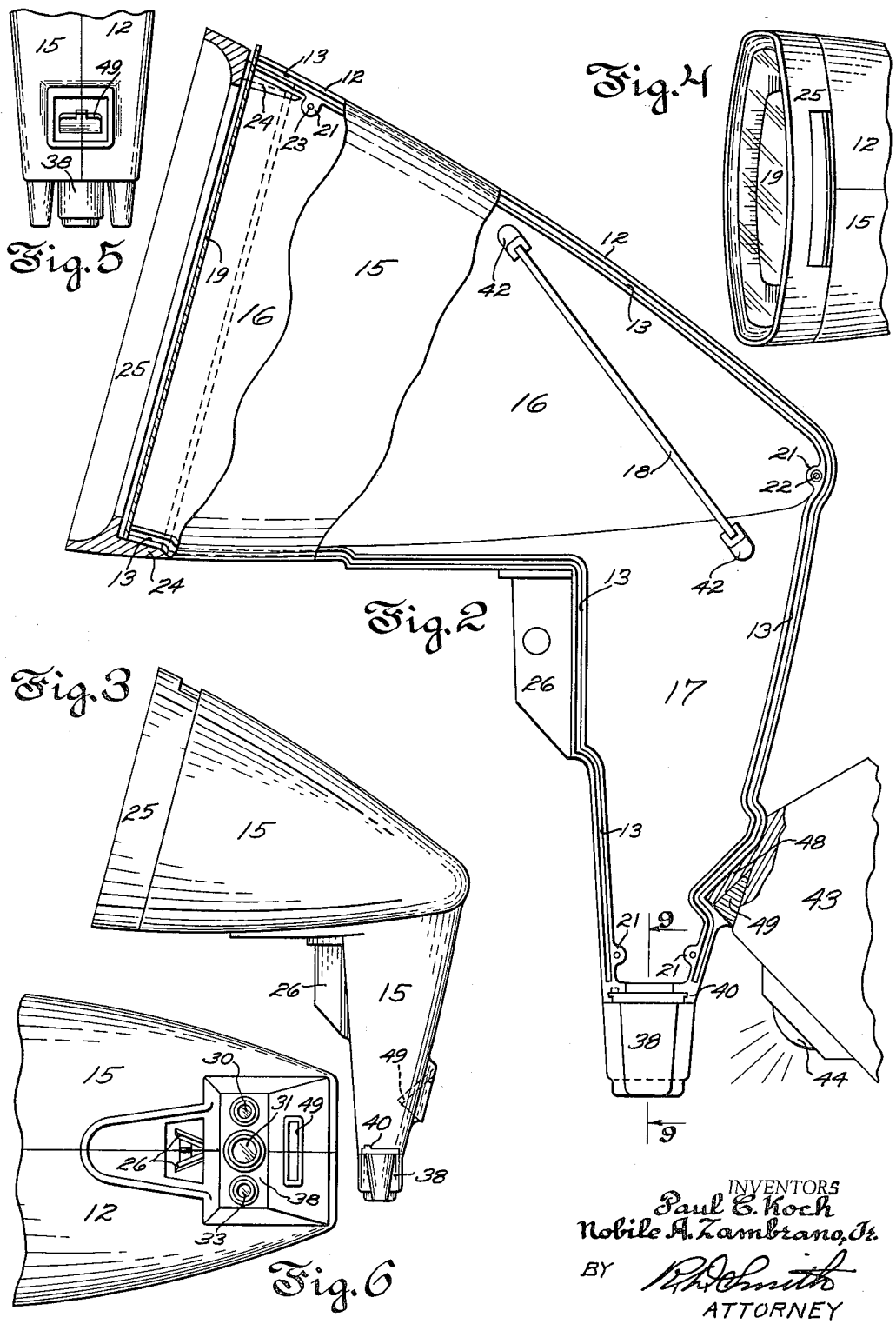

United States Patent Office 3,205,770
Patented Sept. 14, 1965

3,205,770
MICROPROJECTOR
Paul C. Koch and Nobile A. Zambrano, Jr., New Haven, Conn., assignors to The A. C. Gilbert Company, New Haven, Conn., a corporation of Maryland
Filed Jan. 11, 1963, Ser. No. 250,933
5 Claims. (Cl. 88—24)

This invention relates to microprojectors adapted for use as a detachable accessory for microscopes and relates to means by which the magnified image of a spectrum, that would ordinarily be viewed through a conventional eyepiece of the instrument, may instead be projected to and focused upon either a right transmissive or light reflective screen for observation by several persons at a time. The screen may be incorporated removably within the structure of the microprojector or may be at a distance therefrom.

An object of the invention is to provide such microprojector with means for mounting it on a microscope of the type disclosed in a copending patent application, Serial No. 146,486, of common ownership with the present application, in a manner to serve as an interchangeable substitute for the more usual type of eyepieces shown in said application.

Another object is to provide a microprojector with a built-in translucent screen, such as a plate of frosted glass, for displaying on such screen an image of the specimen to be observed by light transmitted through the screen, and so mounted in the microprojector that it can easily be removed therefrom to permit a larger image of the specimen to be beamed outward from the microprojector and focused on some opaque reflective surface that is distant from the microscope such as the wall of a room, a sheet of paper resting on the same table with the microscope, or an ordinary portable picture projection screen equipped with a floor stand.

Another object is to equip the microprojector with object lenses that are slidably shiftable in relation to the specimen so that individual lenses can be trained selectively on the specimen for beaming an image with chosen different degrees of magnification.

These and other objectives of the present improvements will become apparent as the following description proceeds making reference to the accompanying sheets of patent drawings, wherein:

FIG. 1 is a perspective view of the improved microprojector installed on a microscope of the type shown in a copending patent application, Serial No. 146,486, and in place of the eyepieces therein shown.

FIG. 2 is an elevation of the interior of one side of the hollow microprojector viewed from the central plane on which the two equal sides of the microprojector separate.

FIG. 3 is an external side view of the microprojector in reduced size.

FIG. 4 is a plan view of the proximal end of the microprojector carrying the removable screen on which the image normally is cast.

FIG. 5 is a fragmentary view looking from the right at the distal portion of the microprojector in FIG. 3.

FIG. 6 is a bottom plan view looking upward at FIG. 3.

FIG. 7 shows the screen and its bezel of FIG. 2 in exploded relation.

FIG. 8 is a perspective view of the slidable lens carrier drawn on an enlarged scale.

FIG. 9 is a view taken in section on the plane 9—9 in FIG. 2 looking in the direction of the arrows and is drawn on an enlarged scale.

FIG. 10 shows the microscope of FIG. 1 with its standard swung to a prone position in which an image of the specimen can be projected downward toward a table top.

FIG. 11 is a view taken in section on the plane 11—11 in FIG. 7, greatly enlarged.

A microprojector embodying the present improvements is constructed preferably in two substantially equal hollow halves which separate on a central vertical plane. One such half 12 is shown in FIG. 2 as having the uniplanar edge of its shell grooved throughout its length as at 13 whereby to receive and join with a coextensive bead 14 on the other half 15 of the microprojector, a fragment of which other half appears in FIGS. 3 and 11. At suitable intervals each half of the shell wall presents internal ribs 21 which meet end to end. Each such rib in one half of the shell contains a dowel socket 22 that receives with a suitably snug fit an aligning dowel 23 that projects from the mating rib 21 in the other half of the shell.

The shell of the hollow microprojector is of angular overall shape and encloses a proximal chamber 16 in its proximal end portion and a distal chamber 17 in its distal end portion. Chambers 16 and 17 open freely to each other at the junction of said end portions so that rays of light rising from a specimen (not shown) resting on the stage 20 of the microscope beneath the bottom or distal end of chamber 17 pass through lenses 30, or lenses 31 and 32, or lenses 33 and 34 and will fall on and reflect from a mirror 18 obliquely disposed at the junction of chambers 16 and 17 and thus be directed toward the left in FIG. 2 to or through the open mouth of chamber 16. This causes to be displayed on the screen 19 the magnified image of the specimen. Mirror 18 is located and supported by having its margins removably lodged in grooved lugs 42 projecting inward from the walls of chambers 16 and 17.

Screen 19 may be a plate of transparent glass or translucent plastic having a frosted surface which will arrest and display the image of the specimen projected thereupon by mirror 18. This screen is removably held in place by a bordering cap or bezel 25 which has a continuous tapering flange 24 of size and shape to be a press fit in the open mouth of the proximal end of the projector shell as shown in FIG. 2. Screen 19 and bezel 25 are shown in FIG. 2. Screen 19 and bezel 25 are shown separated from each other and from the mouth of the projector in FIG. 7. A light sensitive photographic plate may be substituted for the screen 19 capable of permanently recording the image reflected thereon by mirror 18.

FIGS. 1, 3 and 6 show the mounting lug 26 that is lodged removably in a socket 27 of dovetail shape on the microscope whose construction appears in fuller detail in the aforesaid copending application. Socket 27 is contained in a rearward extending bracket that is fixed atop the post 29 which is longitudinally adjustable in the standard 54 by means of hand knobs 39 in usual manner by means of gear mechanism shown in detail in the said copending application.

In FIG. 9 the aforementioned sets of lenses include in respectively separate sighting bores 35, 36 and 37 through the lense carrier 38 a single lens 30, a set of widely spaced apart double lenses 31 and 32, and a third set of closely neighboring lenses 33 and 34. The lenses in the different bores produce different powers of magnification of a specimen on stage 20 as reflected by mirror 18 upon the screen 19. Any selected one of three lenses or sets of lenses can be brought into play by sliding the lense carrier 38 laterally of the vertical chamber 17 as permitted by the tongue and groove engagement 40 of the lense carrier and the bottom open end of distal chamber 17.

For illuminating the specimen (not shown) on stage 20 of the microscope a multipurpose caged lamp 43 is shown in FIGS. 1 and 2 to be mountable in a choice of positions for projecting light rays, indicated by radiating lines, at the specimen either in a downward direction from a beam concentrating lens 44 of the lamp, or in an upward direction from the same lens 44 through the usual opening 41 in the specimen carrying stage 20 of the microscope. The walls of lamp cage 43 are perforated to permit escape of heat while at the same time shrouding the electric bulb (not shown) in cage 43 that is supplied with current through the flexible attachment cord 45. Lamp cage 43 is equipped with trunnions 46 projecting from its sides to be received and located by the forked ends of a U-shaped bracket 47 on the microscope, and is also equipped with a mounting tongue 4 disposed to enter and be removably lodged in a socket 49 indented in the external surface of the rear wall of distal chamber 17. See FIG. 2.

In use it will be evident from FIG. 10 that the standard 54 of the microscope is pivotally connected to the base 55 at 56 so that the microprojector of these improvements can be positioned to project a magnified image of a specimen clamped to stage 20 downward toward the table top 58 on which the microscope rests. For this purpose the base 55 of the microscope may rest on some means of elevation such as the books 57. A piece of paper, if lying on the table top 58 under the open mouth of the proximal chamber 16 of the microprojector, will thus receive and display a magnified image of the specimen if the screen 19 is removed from the microprojector and can thus be traced for permanent record or photographed conveniently. Also with the screen so removed the open mouth of proximal chamber can be directed at the wall of a darkened room or at any conventional picture reflecting screen by tilting the standard 54 at suitable angles to the base 55. It has been mentioned that by substituting a light sensitive photographic plate for the screen 19 a permanent photographic record can be made of the image reflected thereupon by mirror 18.

What is claimed is:

1. A microprojector comprising, a light excluding elbow-shaped hollow housing having a proximal end portion terminating at an open viewing mouth and a distal end portion angularly related to said proximal end portion in open communication with the latter at an angular junction of said end portions, a lens at said distal end portion in the path of light rays emanating from a specimen outside said distal end portion of said housing and operative to project said rays directly to said angular junction, a mirror positioned at said junction inclined at an angle directly to receive and reflect said rays toward said viewing mouth, and a ray arresting screen spanning said viewing mouth at such distance from said mirror that said reflected rays diverge after leaving said mirror and are focused on said screen to form thereon an image of the specimen that is larger than would be focused on a screen at the locus of said mirror and visible from the exterior of said housing, the standard of a microscope, and mounting means on the external surface of said housing in the crotch of said angular junction of the said end portions of the latter adapted removably to engage and be supported on said standard of a microscope with said proximal portion of said housing overhanging said standard.

2. A microprojector as defined in claim 1, in which the said hollow housing including said mounting means is split and separable into two substantially equal parts having edges that meet along a common plane bisecting both of the said angularly related end portions of said housing, the meeting edge of one of said parts containing a continuous groove and the meeting edge of the other of said parts carrying a continuous bead occupying said groove.

3. A microprojector as defined in claim 1, together with a stage projecting from the said standard for supporting a specimen in sight alignment with the said lens, and means removably carried on the said distal portion of the said housing operative to generate and direct toward the surface of said specimen nearest said lens rays of light to be reflected through said lens to said mirror.

4. A microscope as defined in claim 3, in which the said means to generate light includes a light shrouding cage containing an electric lamp having an offset mounting tongue, the said distal portion of the said hollow housing having a socket disposed to receive and support said cage in removable relation to said housing portion.

5. A microscope as defined in claim 4, in which the said light shrouding cage carries external lateral projections additional to said tongue, together with a forked bracket projecting from the said standard of the microscope beneath the said stage in a manner to straddle said cage and engage said projections for orienting said cage to the said stage of the microscope, whereby said cage may be supported optionally on the said hollow housing for illuminating a stage carried specimen with light received from above and reflected thereby or for illuminating the specimen with light transmitted therethrough from below.

References Cited by the Examiner

UNITED STATES PATENTS

| 105,152 | 7/70 | Webster | 220—76 |
|---|---|---|---|
| 450,794 | 4/91 | Jones | 95—34 |
| 1,727,618 | 9/29 | Rife. | |
| 1,974,654 | 9/34 | May | 88—24 |
| 2,185,926 | 1/40 | Senecal | 88—24 |
| 2,212,123 | 8/40 | Neill et al. | 88—34 |
| 2,313,639 | 3/43 | Hauser | 88—24 |
| 2,329,897 | 9/43 | Heinicke | 88—40 X |
| 2,351,753 | 6/44 | Flint | 88—24 X |

NORTON ANSHER, *Primary Examiner.*

WILLIAM MISIEK, *Examiner.*